United States Patent
Sam et al.

(10) Patent No.: US 9,262,550 B2
(45) Date of Patent: Feb. 16, 2016

(54) PROCESSING SEMI-STRUCTURED DATA

(71) Applicants: Jennifer Sam, Burnaby (CA); Yuru Wang, Coquitlam (CA); George Sun, Coquitlam (CA); JohnPaul Burbank, Vancouver (CA); Michael Tsumura, Vancouver (CA)

(72) Inventors: Jennifer Sam, Burnaby (CA); Yuru Wang, Coquitlam (CA); George Sun, Coquitlam (CA); JohnPaul Burbank, Vancouver (CA); Michael Tsumura, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 271 days.

(21) Appl. No.: 13/842,987

(22) Filed: Mar. 15, 2013

(65) Prior Publication Data

US 2014/0280352 A1 Sep. 18, 2014

(51) Int. Cl.
*G06F 17/30* (2006.01)

(52) U.S. Cl.
CPC ............................... *G06F 17/30917* (2013.01)

(58) Field of Classification Search
None
See application file for complete search history.

(56) References Cited

U.S. PATENT DOCUMENTS

| | | | |
|---|---|---|---|
| 4,994,967 A | 2/1991 | Asakawa | |
| 5,694,592 A | 12/1997 | Driscoll | |
| 5,873,056 A | 2/1999 | Liddy et al. | |
| 5,963,940 A | 10/1999 | Liddy et al. | |
| 6,182,029 B1 | 1/2001 | Friedman | |
| 6,549,897 B1 | 4/2003 | Katariya et al. | |
| 6,741,959 B1 | 5/2004 | Kaiser | |
| 7,027,974 B1 | 4/2006 | Busch et al. | |
| 7,036,080 B1 | 4/2006 | James et al. | |
| 7,181,451 B2 | 2/2007 | Dehlinger et al. | |
| 7,283,846 B2 | 10/2007 | Spriestersbach et al. | |
| 7,324,936 B2 | 1/2008 | Saldanha et al. | |
| 7,558,731 B1 | 7/2009 | Hodjat et al. | |
| 7,676,489 B2 | 3/2010 | Kaiser | |
| 7,792,814 B2 | 9/2010 | Cohen | |
| 7,849,048 B2 | 12/2010 | Langseth et al. | |
| 7,992,078 B2 | 8/2011 | Penner et al. | |
| 8,036,877 B2 | 10/2011 | Treadgold et al. | |
| 8,185,509 B2 | 5/2012 | Cras | |
| 8,229,883 B2 | 7/2012 | Brauer et al. | |
| 8,271,429 B2 | 9/2012 | Ghuneim et al. | |
| 8,468,033 B2 | 6/2013 | Gunn | |
| 8,560,480 B2 | 10/2013 | Du et al. | |
| 8,719,308 B2 | 5/2014 | Xiong et al. | |
| 2002/0120598 A1* | 8/2002 | Shadmon et al. | 707/1 |
| 2004/0148278 A1* | 7/2004 | Milo et al. | 707/3 |

(Continued)

OTHER PUBLICATIONS

Deutsch, Alin, Mary Fernandez, and Dan Suciu. "Storing semistructured data with STORED." ACM SIGMOD Record 28.2 (1999): 431-442.*

(Continued)

*Primary Examiner* — Robert Beausoliel, Jr.
*Assistant Examiner* — Pedro J Santos
(74) *Attorney, Agent, or Firm* — Fish & Richardson P.C.

(57) ABSTRACT

Techniques for processing semi-structured data include receiving semi-structured data, a value of the semi-structured data being associated with a key; identifying a structured data collection, the structured data collection being associated with a category and having a plurality of attributes; obtaining at least one of historical data associated with the plurality of attributes or additional data associated with a user of the computing system; mapping the key to an attribute of the plurality of attributes based on at least one of the historical data or the additional data; and storing the value in a cell of a data record of the structured data collection, the cell being associated with the attribute that was mapped to the key.

15 Claims, 3 Drawing Sheets

(56) References Cited

U.S. PATENT DOCUMENTS

| | | | |
|---|---|---|---|
| 2005/0108630 A1 | 5/2005 | Wasson et al. | |
| 2006/0053127 A1* | 3/2006 | Wen et al. | 707/100 |
| 2006/0053133 A1 | 3/2006 | Parkinson | |
| 2008/0084573 A1 | 4/2008 | Horowitz et al. | |
| 2008/0104032 A1* | 5/2008 | Sarkar | 707/3 |
| 2008/0208805 A1 | 8/2008 | Wang et al. | |
| 2009/0259622 A1* | 10/2009 | Kolz et al. | 707/3 |
| 2011/0208681 A1* | 8/2011 | Kuecuekyan | 706/21 |
| 2012/0136649 A1 | 5/2012 | Freising et al. | |
| 2012/0259865 A1* | 10/2012 | Lakshmanan et al. | 707/748 |
| 2012/0260265 A1* | 10/2012 | Doganata et al. | 719/318 |
| 2013/0086101 A1 | 4/2013 | Heidasch | |
| 2013/0117012 A1 | 5/2013 | Orlin et al. | |
| 2013/0166568 A1* | 6/2013 | Binkert et al. | 707/741 |
| 2013/0166597 A1 | 6/2013 | Khan et al. | |
| 2013/0318119 A1 | 11/2013 | Dalai | |

OTHER PUBLICATIONS

Techtarget website, page XML (Extensible Markup Language); http://searchsoa.techtarget.com/definition/XML.*

Expensify—Android Apps on Google Play; http://play.google.com/store/apps/details?id=org.me.mobiexpensifyg&hl=en; [last visited on Jan. 10, 2013], 2 pages.

Shoeboxed Receipt Tracker and Receipt Reader for iPhone, iPod touch, and iPad on the iTunes App Store; 3 pages; http://itunes.apple.com/us/app/shoeboxed/id322143854?mt=8 [last visited Jan. 10, 2013].

Xpen$er—Mobile Expense, Time, and Mileage Tracker; 4 pages; http://xpenser.com/ [last visited Jan. 10, 2013].

Semi-structured Data: Happy 10th Birthday!—AI3:::Adaptive Information; 14 pages; http://www.mkbergman.com/153/semi-structured-data-happy-10th-birthday/ [last visited Jan. 22, 2013].

* cited by examiner

FIG. 3

PROCESSING SEMI-STRUCTURED DATA

TECHNICAL BACKGROUND

This disclosure relates to processing semi-structured data.

BACKGROUND

Semi-structured data are data where some structure is associated with unstructured data. Semi-structured data may contain tags or other markers to separate semantic elements and enforce hierarchies of fields within unstructured data. Owing to these tags or markers, an alternate name of semi-structured data is self-descriptive data. To map semi-structured data to a structured data collection, such as a relational database or other form of data table, a set of highly accurate rules with predefined patterns may be used to interpret the semi-structured data. Semi-structured data, however, may not conform to the formal structure of data models associated with structured data, and interpreting semi-structured data using such rules can be difficult.

SUMMARY

This disclosure describes systems, methods, apparatus, and computer-readable media for obtaining data from unstructured data for a structured data collection including, for example, the features of receiving semi-structured data, a value of the semi-structured data being associated with a key; identifying a structured data collection, the structured data collection being associated with a category and having a plurality of attributes; obtaining at least one of historical data associated with the plurality of attributes or additional data associated with a user of the computing system; mapping the key to an attribute of the plurality of attributes based on at least one of the historical data or the additional data; and storing the value in a cell of a data record of the structured data collection, the cell being associated with the attribute that was mapped to the key.

In a first aspect combinable with any of the general embodiments, receiving the semi-structured data includes receiving unstructured data; and receiving one or more inputs from a user to associate a value of the unstructured data with the key.

A second aspect combinable with any of the general embodiments includes displaying one or more keys from which the user can select to associate with the value of the unstructured data.

A third aspect combinable with any of the general embodiments includes converting the semi-structured data into a natural language text data; and embedding the key in the natural language text data.

In a fourth aspect combinable with any of the previous aspects, obtaining historical data associated with the plurality of attributes includes obtaining values associated with keys that were previously mapped to the attributes; and mapping the key to the attribute based on historical data includes matching the value of the semi-structured data with a value associated with a key that was previously mapped to the attribute.

In a fifth aspect combinable with any of the previous aspects, obtaining additional data associated with a user of the computing system includes at least one of (i) obtaining a location associated with the user, or (ii) accessing a contacts database associated with the user; and mapping the key to the attribute based on the additional data includes at least one of (i) determining that the value of the semi-structured data is associated with the location and the location is associated with the attribute, or (ii) determining that the value of the semi-structured data is associated with information in the contacts database and the information in the contacts database is associated with the attribute.

In a sixth aspect combinable with any of the previous aspects, identifying a structured data collection includes identifying the category associated with the structured data collection based on another key appearing at a beginning of the semi-structured data.

Particular implementations of the subject matter described in this disclosure can be implemented so as to realize none, one, or more of the following advantages. A user may embed semi-structured information into unstructured text data. The semi-structured data with the embedded information may be converted to structured data. The computing system may increase the chances of correctly converting semi-structured data to structured data using rules, name catalogs, and historical data associated with attributes of a structured data collection, additional data associated with a user of the computing system, and data from external systems and services to classify values in the semi-structured data and to resolve ambiguities. The computing system may use the historical data and the correctly identified terms of the unstructured data to improve and expand the rules and name catalogs used to obtain data from the semi-structured data.

These general and specific aspects may be implemented using a device, system or method, or any combinations of devices, systems, or methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more implementations are set forth in the accompanying drawings and the description below. Other features, objects, and advantages will be apparent from the description and drawings, and from the claims.

DETAILED DESCRIPTION

In a general implementation of the present disclosure, a computing system obtains data from semi-structured data for a structured data collection. A structured data collection can be, for example, a database table or a spreadsheet table. A table is a set of data elements or values that are organized using a model of vertical columns and horizontal rows of cells. A category is the name of the table. The attributes of the category are the columns of the table, where each column may be identified by an attribute name. A data element or value may be stored in a cell, which is referenced by a column and a row. A data element stored in a cell is associated with the attribute represented by the column in which the data element in stored.

Semi-structured data, in some aspects, are data where some structure is associated with unstructured data. Semi-structured data may contain tags or other markers to separate semantic elements and enforce hierarchies of fields within unstructured data. Because semi-structured data may not conform to the formal structure of data models associated with structured data, the data obtained from semi-structured data may be ambiguous. For example, semi-structured data that includes the text string "Boston Market" may result in an ambiguity for the term "Boston." The computing system may identify the term "Boston" as being associated with a city attribute and the terms "Boston Market" as being associated with a restaurant attribute. The computing system may increase the chances of correctly identifying one or more terms in the semi-structured data by using rules, name catalogs, and historical data associated with attributes of a structured data collection, additional data associated with a user of the computing system, and data from external systems and services to classify terms or phrases, also referred to as values, in the semi-structured data and to resolve ambiguities.

Figure 1:
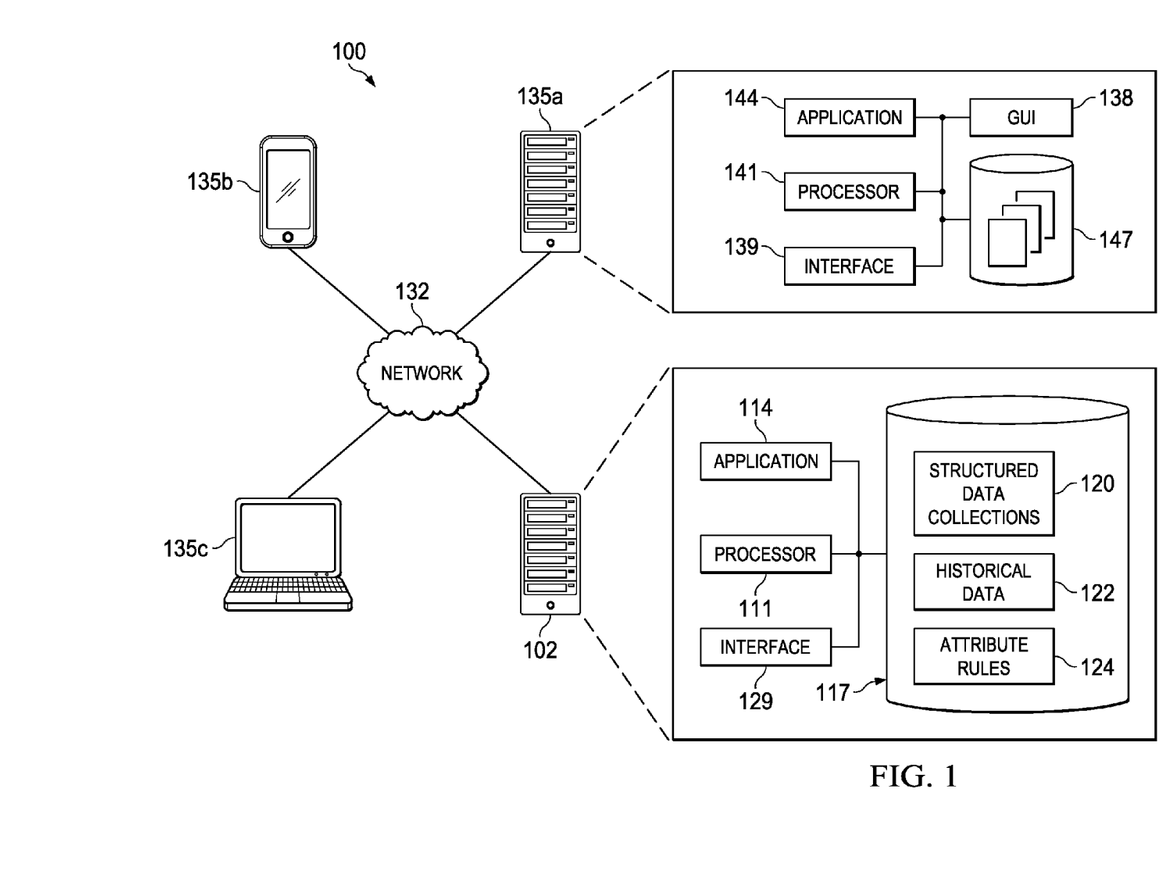
FIG. 1 shows an example of a distributed computing system environment operable to process semi-structured data.

FIG. 1 shows an example of a distributed computing system environment 100 operable to obtain data from unstructured data for a structured data collection. The environment 100 includes or is communicably coupled with a server 102 and one or more clients 135, at least some of which communicate across network 132. The server 102 stores one or more hosted applications 114, where at least a portion of the hosted applications 114 are executed via requests and responses sent to users or clients within and communicably coupled to the environment 100. An example of a hosted application 114 is a data extraction application. An example of a data extraction application is an application that obtains data from semi-structured for a structured data collection. The data extraction application is executed by the server 102 to interpret semi-structured data and convert semi-structured data to unstructured data and structured data.

In some instances, the server 102 may store a plurality of various hosted applications 114, while in other instances, the server 102 may be a dedicated server meant to store and execute only a single hosted application 114. In some instances, the server 102 may include a web server, where the hosted applications 114 represent one or more web-based applications accessed and executed via network 132 by the clients 135 of the system to perform the programmed tasks or operations of the hosted application 114. At a high level, the server 102 includes an electronic computing device operable to receive, transmit, process, store, or manage data and information associated with the environment 100. Specifically, the server 102 illustrated in FIG. 1 is responsible for receiving application requests from one or more client applications 144 associated with the clients 135 of environment 100 and responding to the received requests by processing said requests in the associated hosted application 114, and sending the appropriate response from the hosted application 114 back to the requesting client application 144.

In addition to requests from the external clients 135 illustrated in FIG. 1, requests associated with the hosted applications 114 may also be sent from internal users, external or third-party customers, other automated applications, as well as any other appropriate entities, individuals, systems, or computers. As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, a virtual server, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system.

In the present implementation, and as shown in FIG. 1, the server 102 includes a processor 111, an interface 129, a memory 117, and one or more hosted applications 114. The interface 129 is used by the server 102 for communicating with other systems in a client-server or other distributed environment (including within environment 100) connected to the network 132 (e.g., client 135, as well as other systems communicably coupled to the network 132). Generally, the interface 129 includes logic encoded in software and/or hardware in a suitable combination and operable to communicate with the network 132. More specifically, the interface 129 may include software supporting one or more communication protocols associated with communications such that the network 132 or interface's hardware is operable to communicate physical signals within and outside of the illustrated environment 100.

Generally, the network 132 facilitates wireless or wireline communications between the components of the environment 100 (i.e., between the server 102 and the clients 135), as well as with any other local or remote computer, such as additional clients, servers, or other devices communicably coupled to network 132 but not illustrated in FIG. 1. The network 132 is illustrated as a single network in FIG. 1, but may be a continuous or discontinuous network without departing from the scope of this disclosure, so long as at least a portion of the network 132 may facilitate communications between senders and recipients. The network 132 may be all or a portion of an enterprise or secured network, while in another instance at least a portion of the network 132 may represent a connection to the Internet. In some instances, a portion of the network 132 may be a virtual private network (VPN), such as, for example, the connection between the client 135 and the server 102.

Further, all or a portion of the network 132 can include either a wireline or wireless link. Example wireless links may include 802.11a/b/g/n, 802.20, WiMax, and/or any other appropriate wireless link. In other words, the network 132 encompasses any internal or external network, networks, sub-network, or combination thereof operable to facilitate communications between various computing components inside and outside the illustrated environment 100. The network 132 may communicate, for example, Internet Protocol (IP) packets, Frame Relay frames, Asynchronous Transfer Mode (ATM) cells, voice, video, data, and other suitable information between network addresses. The network 132 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, server 102 includes a processor 111. Although illustrated as a single processor 111 in FIG. 1, two or more processors may be used according to particular needs, desires, or particular embodiments of environment 100. Each processor 111 may be a central processing unit (CPU), a blade, an application specific integrated circuit (ASIC), a field-programmable gate array (FPGA), or another suitable component. Generally, the processor 111 executes instructions and manipulates data to perform the operations of server 102 and, specifically, the one or more plurality of hosted applications 114. Specifically, the server's processor 111 executes the functionality required to receive and respond to requests from the clients 135 and their respective client applications 144, as well as the functionality required to perform the other operations of the hosted application 114.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, ABAP, Visual Basic, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 111 executes one or more hosted applications 114 on the server 102.

At a high level, each of the one or more hosted applications 114 is any application, program, module, process, or other software that may execute, change, delete, generate, or otherwise manage information according to the present disclosure, particularly in response to and in connection with one or more requests received from the illustrated clients 135 and their associated client applications 144. In certain cases, only one hosted application 114 may be located at a particular server 102. In others, a plurality of related and/or unrelated hosted applications 114 may be stored at a single server 102, or located across a plurality of other servers 102, as well. In certain cases, environment 100 may implement a composite hosted application 114. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. In some embodiments, portions of the composite application may be implemented through a single enterprise-class solution for data integration, data quality, data profiling, and text analysis.

Additionally, the hosted applications 114 may represent web-based applications accessed and executed by remote clients 135 or client applications 144 via the network 132 (e.g., through the Internet). Further, while illustrated as internal to server 102, one or more processes associated with a particular hosted application 114 may be stored, referenced, or executed remotely. For example, a portion of a particular hosted application 114 may be a web service associated with the application that is remotely called, while another portion of the hosted application 114 may be an interface object or agent bundled for processing at a remote client 135. Moreover, any or all of the hosted applications 114 may be a child or sub-module of another software module or enterprise application (not illustrated) without departing from the scope of this disclosure. Still further, portions of the hosted application 114 may be executed by a user working directly at server 102, as well as remotely at client 135.

The illustrated server 102 also includes memory 117. Memory 117 may include any memory or database module and may take the form of volatile or non-volatile memory including, without limitation, magnetic media, optical media, random access memory (RAM), read-only memory (ROM), removable media, or any other suitable local or remote memory component. Memory 117 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 114. For example, memory 117 may store structured data collections 120, historical data 122, and attribute rules 124 that are used by the server 102 to identify values from semi-structured data as being associated with a structured data collection. Additionally, memory 117 may include any other appropriate data, such as VPN applications, firmware logs and policies, firewall policies, a security or access log, print or other reporting files, as well as others.

The illustrated environment of FIG. 1 also includes one or more clients 135. Each client 135 may be any computing device operable to connect to or communicate with at least the server 102 and/or via the network 132 using a wireline or wireless connection. Further, as illustrated by client 135a, each client 135 includes a processor 141, an interface 139, a graphical user interface (GUI) 138, a client application 144, and a memory 147. In general, each client 135 includes an electronic computer device operable to receive, transmit, process, and store any appropriate data associated with the environment 100 of FIG. 1.

There may be any number of clients 135 associated with, or external to, environment 100. For example, while illustrated environment 100 includes three clients (135a, 135b, and 135c), alternative implementations of environment 100 may include a single client 135 communicably coupled to the server 102, or any other number suitable to the purposes of the environment 100. Additionally, there may also be one or more additional clients 135 external to the illustrated portion of environment 100 that are capable of interacting with the environment 100 via the network 132. Further, the term "client" and "user" may be used interchangeably as appropriate without departing from the scope of this disclosure.

Moreover, while each client 135 is described in terms of being used by a single user, this disclosure contemplates that many users may use one computer, or that one user may use multiple computers. As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may include a computer that includes an input device, such as a keypad, touch screen, mouse, or other device that can accept user information, and an output device that conveys information associated with the operation of the server 102 (and hosted application 114) or the client 135 itself, including digital data, visual information, the client application 144, or the GUI 138. Both the input and output device may include fixed or removable storage media such as a magnetic storage media, CD-ROM, or other suitable media to both receive input from and provide output to users of the clients 135 through the display, namely, the GUI 138.

Further, the illustrated client 135 includes a GUI 138 including a graphical user interface operable to interface with at least a portion of environment 100 for any suitable purpose, including generating a visual representation of the client application 144 (in some instances, the client's web browser) and the interactions with the hosted application 114, including the responses received from the hosted application 114 received in response to the requests sent by the client application 144. Generally, through the GUI 138, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 138 can represent any graphical user interface, including but not limited to, a web browser, touch screen, or command line interface (CLI) that processes information in environment 100 and efficiently presents the information results to the user.

In general, the GUI 138 may include a plurality of user interface (UI) elements, some or all associated with the client application 144, such as interactive fields, pull-down lists, and buttons operable by the user at client 135. These and other UI elements may be related to or represent the functions of the client application 144, as well as other software applications executing at the client 135. In particular, the GUI 138 may be used to present the client-based perspective of the hosted application 114, and may be used (as a web browser or using the client application 144 as a web browser) to view and navigate the hosted application 114, as well as various web pages located both internal and external to the server, some of which may be associated with the hosted application 114. For purposes of the present location, the GUI 138 may be a part of or the entirety of the client application 144, while also merely a tool for displaying the visual representation of the client and hosted applications' 114 actions and interactions. In some instances, the GUI 138 and the client application 144 may be used interchangeably, particularly when the client application 144 represents a web browser associated with the hosted application 114.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
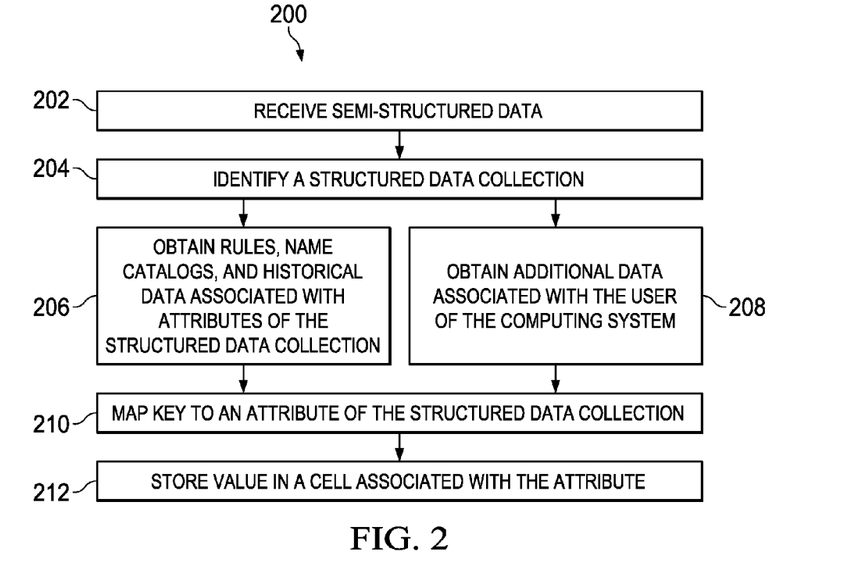
FIG. 2 shows a flowchart of examples of operations for processing semi-structured data.

FIG. 2 shows a flowchart of examples of operations 200 performed by a computing system of one or more computers, e.g., the server 102 of FIG. 1, to process semi-structured data. For purposes of illustration and without loss of generality, the operations 200 of FIG. 2 will be described with respect to an expense report application executed by the computing system.

In FIG. 2, the computing system receives semi-structured data at 202. The computing system may receive semi-structured data via user input. The user may input unstructured data as, for example, text, voice, or image. If the unstructured data is in a format other than text, the computing system may identify text in the unstructured data by, for example, converting a portion of the unstructured data to text. The computing system may perform text analysis and part-of-speech tagging on the text.

The computing system may provide a user interface that accepts unstructured and semi-structured data via user input. The user interface may display the text and include a mechanism by which the user can input semi-structured information to be embedded in the unstructured data. For example, the user interface may include drop-down menus that are displayed next to values in the unstructured data that are selected by the user. The drop-down menus may include predefined keys that a user can select to associate with a value. In some implementations, the computing system converts the semi-structured data into a natural language text data and embeds the key in the natural language text data.

The semi-structured data may include one or more values that are each associated with a corresponding key. If the key appears at the beginning of the semi-structured data, the key indicates a category of a structured data collection, for example, a category of a database table or a spreadsheet, and the value associated with the key is mapped to a name of the structured data collection. The value need not be the same as the name of the structured data collection. For example, a value "spending" and "charge" may be mapped to a database table named "expense".

If the key appears in the semi-structured data other than at the beginning, the key is mapped to an attribute of a structured data collection, and the value associated with the key is mapped to a cell that is referenced by the attribute. The key need not be the same as the name of the attribute. For example, the keys "amount", "cost", "value", and "payment" may be mapped to a column labeled "Price". A value that is mapped to a cell that is referenced by an attribute is also described in this disclosure as being mapped to the attribute itself.

A user may markup the semi-structured data to associate values with keys. For example, the user may input "I spent $50 today." The user may markup the input with keys to create the semi-structured data "{{category:spending}}I spent {{amount:$50}} today." In the example semi-structured data, an outer "{ }" indicates that all values within the outer "{ }" have corresponding keys, and an inner "{ }" identifies a value and its corresponding key. The markup "{category:spending}" will map the semi-structured data to a structured data collection associated with a category that can be mapped to the value "spending", such as a database table named "expense". The markup "{amount:$50}" will map the value "$50" to a cell referenced by an attribute that can be mapped to the key "amount", such as a cell under a column labeled "Price". Other markup formats are possible. For example, "{ }" may be replaced with "[ ]" to specify values and associated keys in the semi-structured data.

The computing system identifies a structured data collection, for example, a database table or spreadsheet, at 204. The computing system may identify a structured data collection based on, for example, a value that appears at the beginning of the semi-structured data. The key associated with the value indicate a category of a structured data collection, and the value is mapped to a name of a structured data collection. The structured data collection is associated with a set of attributes. Each attribute of the set of attributes is associated with rules, name catalogs, and historical data that the computing system uses to map keys from the semi-structured data to the attributes. Labels may be associated with the attributes that are appropriate for the situation represented by the structured data collection.

For example, a database table or a spreadsheet of an expense report may be associated with a set of attributes that include restaurant, city, amount, and person. Labels are associated with the attributes that are appropriate for an expense report. For example, the label "Restaurant" is associated with the restaurant attribute, the label "City" is associated with the city attribute, the label "Price" is associated with the amount attribute, and the label "Attendees" is associated with the person attribute.

The computing system obtains rules, name catalogs, and historical data associated with the attributes of the structured data collection at 206. The rules, name catalogs, and historical data may be used to map values and keys from the semi-structured data to the attributes of the structured data collection. The name catalogs and historical data may be used to resolve ambiguities associated with mapping the values and keys from the semi-structured data. For example, a value or a key mapped to an attribute using the rules may be compared with data from the name catalogs and historical data to resolve ambiguities in mapping of the values or the keys to the attributes.

The rules may be used to map values or keys of the semi-structured data to attributes of the structured data collection. In some implementations, the rules of the attribute may specify predefined patterns or characteristics of a value that may be mapped to an attribute. For example, a rule for the amount attribute may specify that a value that includes a series of numbers and a "$" symbol may be mapped to the amount attribute. In some implementations, the rules of an attribute may specify keys that may be mapped to the attribute. For example, a rule for the amount attribute may specify that the keys "amount," "number," "price," "quantity," and "value" may be mapped to the amount attribute.

A name catalog may be used to map values or keys from the semi-structured data to an attribute corresponding to the name catalog. The name catalogs associated with the attribute may be, for example, a list of entity names that are associated with the attribute. For example, a name catalog for the restaurant attribute may include "Boston Market" as a value that may be mapped to a cell referenced by the restaurant attribute. The values of the semi-structured data may be compared to the entity names in the name catalogs to find a match. A value that matches an entity name in a name catalog may be mapped to a cell referenced by the attribute corresponding to the name catalog, and the corresponding key may be mapped to the attribute.

The name catalogs may be used to resolve ambiguities associated with mapping values and keys to attributes. For example, a value that is mapped to two or more attributes using each attribute's rules may be compared with values in each attribute's name catalog. If the value mapped to the attributes using the rules matches a value in one attribute's name catalog but not the other attribute's name catalog, the value is more likely associated with the attribute in which the matching value was found in the corresponding name catalog.

Historical data associated with the attribute may include values or keys that were previously entered or verified by one or more users as being mapped to the attribute. The computing system may map a value to an attribute by matching the value in the semi-structured data with a value that was previously mapped to the attribute. The computing system may map a key to an attribute by matching the corresponding value with a value associated with a key that was previously mapped to the attribute or by matching the key in the semi-structured data with a key that was previously mapped to the attribute. The historical data for an attribute may be collected from multiple different users' input data and from multiple different structured data collections. Similar to the name catalogs, the historical data may be used to map values or keys from the semi-structured data to attributes of a structured data collection and to resolve ambiguities associated with mapping of the values or keys. For example, a value of the semi-structured data may be mapped to an attribute when the value matches a value included in the historical data for the attribute. The computing system may use the historical data to improve and expand the rules and name catalogs associated with the attribute.

The computing system obtains additional data associated with the user of the computing system at 208. Additional data associated with the user can include, for example, information about the user's location, contacts, calendars, events, tasks, language use history, social media history, and preferences. The additional data may be used to map values or keys from the semi-structured data to the attributes. The additional data may be used to resolve ambiguities associated with mapping of the values or the keys to the attributes of the structured data collection.

The computing system may obtain geographic coordinates specifying the user's geographic location from a GPS sensor or cellular triangulation. The coordinates may be used to obtain location information from a location service. The location information may be, for example, name of the city, state, country, or business at the geographic location specified by the user's geographic coordinates. The location information may be used to determine the currency being used or the rate of exchange. The computing system may compare keys or values from the semi-structured data with information obtained based on the user's location to resolve ambiguities. For example, the computing system may map a key to an attribute by determining that the key or corresponding value is associated with the location information and the location information is associated with the attribute.

The computing system may obtain information from the user's contacts database, calendars, or tasks lists. Information from the user's contacts database may include, for example, names, phone numbers, addresses, and emails of the user's contacts. Information from the user's calendar, events lists, and tasks lists may include, for example, event locations, phone numbers, addresses, and attendees. The computing system may compare keys or values from the semi-structured data with information obtained from the user's contacts database, calendars, or tasks lists to resolve ambiguities. For example, the computing system may map a key to an attribute by determining that the key or corresponding value is associated with the information obtained from the user's contacts database, calendars, or tasks lists and the information obtained from the user's contacts database, calendars, or tasks lists is associated with the attribute.

The computing system may obtain information associated with the user's language use history. The user's language use history includes keys or values that were previously entered or verified by the user as being mapped to the attribute. The computing system may compare keys or values from the semi-structured data with keys or values from the user's language use history to resolve ambiguities. For example, the computing system may map a key to an attribute by determining that the key or corresponding value matches a key or a value that was previously entered and verified by the user as being mapped to the attribute.

The computing system may obtain information associated with the user's social media history and preferences from social media sites and other websites with which the user interacts. The user's social media history and preferences may include information associated with people and places. These associations may be used to derive proper nouns of people, places, and things. The computing system may compare keys or values from the semi-structured data with information associated with the user's social media history and preferences. For example, the computing system may map a key to an attribute by determining that the key or corresponding value is associated with the information obtained from the user's social media history or preferences and the information obtained from the user's social media history and preferences is associated with the attribute.

When using more than one type of additional data to resolve ambiguities, the additional data may be associated with an accuracy modifier based on the type of data. For example, language use history matches could be considered 1.2 times more likely to be correct than social media history matches. In some implementations, the accuracy modifiers for each type of additional data may be set by an application developer as an application configuration. In some implementations, the accuracy modifiers for each type of additional data may be set based on the history of resolving ambiguities using that data type. For example, if the history for resolving ambiguities using social media history shows that ambiguities are correctly resolved 50% of the time and the history for resolving ambiguities using language use history shows that ambiguities are resolved 75% of the time, the accuracy modifier for social media history will be lower than the accuracy modifier for language use history.

The computing system may obtain other data from external systems and services as alternatives or in addition to the data described above. For example, the computing system may obtain data from applications external to the expense report application. As another example, the computing system may obtain data from cloud-based services such as cloud-based computing and storage services. The computing system may use such data to map keys to attributes or to resolve ambiguities associated with the mapping of keys to attributes.

The computing system maps the keys from the semi-structured data to the attributes of the structured data collection at 210. To map the keys to the attributes, the computing system may apply attribute rules to the keys or corresponding values of the semi-structured data. The computing system may compare and match the keys or values to the entity names in the name catalogs associated with the attributes, the historical data associated with the attributes, or the additional data associated with the user.

The computing system stores the values in cells associated with the respective attributes that were mapped to the corresponding keys at 212. The computing system may store the values in response to receiving a verification from the user that the keys were correctly mapped to the attributes by the computing system. The computing system may use correctly mapped values and keys to improve and expand the rules and name catalogs associated with the respective attributes.

Figure 3:
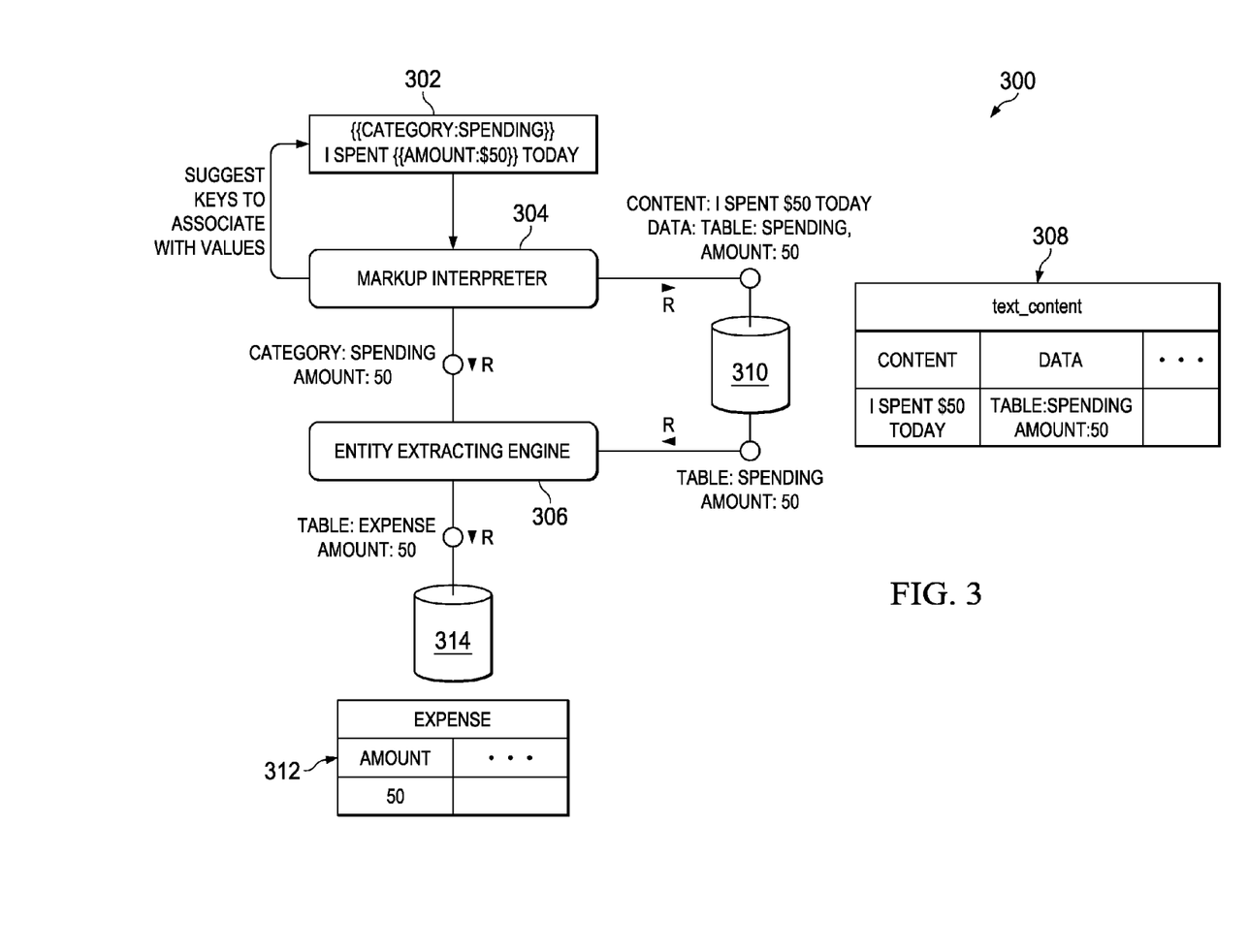
FIG. 3 shows a block diagram of an example of a system operable to process semi-structured data.

FIG. 3 shows a block diagram of an example of a system 300 operable to process semi-structured data 302. The system 300 includes a markup interpreter 304 and an entity extraction engine 306.

The markup interpreter 304 may receive unstructured data from a user and suggest keys that the user can select to associate with values in the unstructured data. The markup interpreter 304 receives the semi-structured data 302 that includes one or more values and corresponding keys. The markup interpreter 302 identifies and extracts the values and keys from the semi-structured data 302. The markup interpreter 302 converts the semi-structured data 302 to a data structure 308 that includes natural language text data and the values and corresponding keys. The markup interpreter 302 may store the data structure 308 in a memory 310 for later processing.

In FIG. 3, the markup interpreter 304 receives the semi-structured data "{{category:spending}}I spent {{amount:$50}} today". The markup interpreter identifies and extracts "{category:spending}" and "{amount:50}" from the semi-structured data 302. The markup interpreter 304 converts the semi-structured data 302 to a data structure 308 with the natural language text content "I spent $50 today" and the data "table:spending" and "amount:50". The markup interpreter 304 may store the data structure 308 in the memory 310.

The entity extraction engine 306 may receive values and corresponding keys from the markup interpreter 304 or the memory 310. The entity extraction engine 306 maps the keys to an actual database model. When mapping the keys to a database model, the entity extraction engine 306 may resolve ambiguities associated with mapping of the keys to the database model.

In FIG. 3, the entity extraction engine 306 receives "category:spending" and "amount:50" from the markup interpreter 304. Alternatively, the entity extraction engine 306 may receive "table:spending" and "amount:50" from the memory 308. The entity extraction engine 306 maps "table:spending" to a database table 312 named "expense" and maps the value "50" from "amount:50" to a column of the database table 312 labeled "amount". The entity extraction engine 306 may store the database table 312 in a memory 314.

A number of implementations have been described. Nevertheless, it will be understood that various modifications may be made. For example, other methods described herein besides or in addition to that illustrated in FIG. 2 may be performed. Further, the illustrated steps of process 200 may be performed in different orders, either concurrently or serially. Further, steps may be performed in addition to those illustrated in process 200, and some steps illustrated in process 200 may be omitted without deviating from the present disclosure. Accordingly, other implementations are within the scope of the following claims.

What is claimed is:

1. A method performed with a computing system for processing semi-structured data, the method comprising:
 receiving semi-structured data comprising two or more keys, wherein for each key, the semi-structured data further comprising a markup symbol that associates a value with the key;
 determining that a location of a first key within the semi-structured data is at a beginning of the semi-structured data, and in response, determining that the first key indicates a category of the semi-structured data;
 identifying a structured data collection, the structured data collection being associated with the category and having a plurality of attributes;
 obtaining at least one of i) historical data associated with the plurality of attributes or ii) additional data associated with a user of the computing system;
 determining a location of a second key within the semi-structured data other than the beginning of the semi-structured data, and in response, mapping the second key to an attribute of the plurality of attributes based on at least one of the obtained historical data or the obtained additional data; and
 storing the value associated with the second key in a cell of a data record of the structured data collection that is associated with the mapped attribute to the key.

2. The method of claim 1, wherein receiving the semi-structured data comprises:
 receiving unstructured data; and
 for each key, receiving one or more inputs from a user to associate a value of the unstructured data with the key.

3. The method of claim 1, further comprising, for each key:
 identifying the value and the key in the semi-structured data based on the markup symbol;

extracting the value and the key from the semi-structured data; and converting the semi-structured data into a data structure comprising a natural language text data and, for each key, a data pair including the key and the value.

4. The method of claim 1, wherein:

obtaining historical data associated with the plurality of attributes comprises obtaining values associated with keys that were previously mapped to the attributes; and for each key, mapping the key to the attribute based on historical data comprises matching the value of the semi-structured data with a value associated with a key that was previously mapped to the attribute.

5. The method of claim 1, wherein:

obtaining additional data associated with a user of the computing system comprises at least one of (i) obtaining a location associated with the user, or (ii) accessing a contacts database associated with the user; and for each key, mapping the key to the attribute based on the additional data comprises at least one of (i) determining that the value of the semi-structured data is associated with the location and the location is associated with the attribute, or (ii) determining that the value of the semi-structured data is associated with information in the contacts database and the information in the contacts database is associated with the attribute.

6. A non-transitory computer readable storage medium encoded with a computer program, the program comprising instructions that when executed by one or more computers cause the one or more computers to perform operations comprising:

receiving semi-structured data comprising two or more keys, wherein for each key, the semi-structured data further comprising a markup symbol that associates a value with the key;

determining that a location of a first key within the semi-structured data is at a beginning of the semi-structured data, and in response, determining that the first key indicates a category of the semi-structured data;

identifying a structured data collection, the structured data collection being associated with the category and having a plurality of attributes;

obtaining at least one of i) historical data associated with the plurality of attributes or ii) additional data associated with a user of the computing system;

determining a location of a second key within the semi-structured data other than the beginning of the semi-structured data, and in response, mapping the second key to an attribute of the plurality of attributes based on at least one of the obtained historical data or the obtained additional data; and storing the value associated with the second key in a cell of a data record of the structured data collection that is associated with the mapped attribute to the key.

7. The computer readable storage medium of claim 6, wherein receiving the semi-structured data comprises:

receiving unstructured data; and for each key, receiving one or more inputs from a user to associate a value of the unstructured data with the key.

8. The computer readable storage medium of claim 6, the operations further comprising, for each key:

identifying the value and the key in the semi-structured data based on the markup symbol;

extracting the value and the key from the semi-structured data; and converting the semi-structured data into a data structure comprising a natural language text data and, for each key, a data pair including the key and the value.

9. The computer readable storage medium of claim 6, wherein:

obtaining historical data associated with the plurality of attributes comprises obtaining values associated with keys that were previously mapped to the attributes; and for each key, mapping the key to the attribute based on historical data comprises matching the value of the semi-structured data with a value associated with a key that was previously mapped to the attribute.

10. The computer readable storage medium of claim 6, wherein:

obtaining additional data associated with a user of the computing system comprises at least one of (i) obtaining a location associated with the user, or (ii) accessing a contacts database associated with the user; and for each key, mapping the key to the attribute based on the additional data comprises at least one of (i) determining that the value of the semi-structured data is associated with the location and the location is associated with the attribute, or (ii) determining that the value of the semi-structured data is associated with information in the contacts database and the information in the contacts database is associated with the attribute.

11. A system comprising:

one or more processors; and a non-transitory computer-readable medium storing instructions executable by the one or more processors to perform operations comprising:

receiving semi-structured data comprising two or more keys, wherein for each key, the semi-structured data further comprising a markup symbol that associates a value with the key;

determining that a location of a first key within the semi-structured data is at a beginning of the semi-structured data, and in response, determining that the first key indicates a category of the semi-structured data;

identifying a structured data collection, the structured data collection being associated with the category and having a plurality of attributes;

obtaining at least one of i) historical data associated with the plurality of attributes or ii) additional data associated with a user of the computing system;

determining a location of a second key within the semi-structured data other than the beginning of the semi-structured data, and in response, mapping the second key to an attribute of the plurality of attributes based on at least one of the obtained historical data or the obtained additional data; and storing the value associated with the second key in a cell of a data record of the structured data collection that is associated with the mapped attribute to the key.

12. The system of claim 11, wherein receiving the semi-structured data comprises:

receiving unstructured data; and for each key, receiving one or more inputs from a user to associate a value of the unstructured data with the key.

13. The system of claim 11, the operations further comprising, for each key:

identifying the value and the key in the semi-structured data based on the markup symbol;

extracting the value and the key from the semi-structured data; and converting the semi-structured data into a data structure comprising a natural language text data and, for each key, a data pair including the key and the value.

14. The system of claim 11, wherein:

obtaining historical data associated with the plurality of attributes comprises obtaining values associated with keys that were previously mapped to the attributes; and for each key, mapping the key to the attribute based on historical data comprises matching the value of the semi-structured data with a value associated with a key that was previously mapped to the attribute.

15. The system of claim 11, wherein:

obtaining additional data associated with a user of the computing system comprises at least one of (i) obtaining a location associated with the user, or (ii) accessing a contacts database associated with the user; and for each key, mapping the key to the attribute based on the additional data comprises at least one of (i) determining that the value of the semi-structured data is associated with the location and the location is associated with the attribute, or (ii) determining that the value of the semi-structured data is associated with information in the contacts database and the information in the contacts database is associated with the attribute.

* * * * *